UNITED STATES PATENT OFFICE.

JOHN W. HYATT, OF NEWARK, NEW JERSEY, AND CHARLES M. HYATT, OF ALBANY, NEW YORK.

IMPROVEMENT IN SILICIOUS MATERIAL TO IMITATE IVORY AND SIMILAR SUBSTANCES.

Specification forming part of Letters Patent No. 201,348, dated March 19, 1878; application filed December 13, 1877.

*To all whom it may concern:*

Be it known that we, JOHN W. HYATT, of the city of Newark, in the county of Essex and State of New Jersey, and CHARLES M. HYATT, of the city of Albany, in the county of Albany and State of New York, have invented a new and useful Improvement in Silicious Material, of which the following is a specification:

The invention relates to an improved silicious material formed of the ingredients or their equivalents, combined and treated substantially in the manner hereinafter described, and manipulated substantially as below set forth.

The object of the invention is to produce a material the elements of which are thoroughly blended, and which is insoluble in water, plastic when acted upon by heat or heated surfaces, non-combustible, water-proof, and possessed of such other qualities as adapt it for producing nearly all the articles now made of bone, horn, hoof, ivory, porcelain, and other analogous substances.

To finely-pulverized bone, horn, hoof, ivory, ivory-nut, or other similar substance containing gluten, albumen, and animal oil, or gluten or albumen, is added two (2) equal portions, by weight, of a solution of any of the alkaline silicates—silicate of soda preferred—the silicate being of about the consistency of sirup or molasses. This mixture forms a doughy mass, wherein the powdered bone, for instance, is partially dissolved by the action of the silicate, being so softened as to be plastic; hence any substance that will thus affect the said first-named ingredient is to be held and deemed an equivalent of the said silicates in this relation.

The operation of mixing should be thoroughly performed, preferably until the said mass becomes of such tenacity and consistency that it will not adhere to surfaces with which it comes in contact. The admixture may be very conveniently and satisfactorily effected by means of mixing-rollers, which may be heated or cool, as desired, though, of course, many other means may be employed. The composition thus produced is now rolled or otherwise formed into sheets or strips, which, without further treatment, may be divided, and the whole strip or portions thereof may be formed into the shapes desired by means of molds or dies made of or lined with porous material, or by covering the composition with such material, and then subjecting it so enveloped to the operation of dies. Thus the composition is simultaneously formed into shapes and dried, the result being a very hard and useful material.

Another method of manipulating the composition is to dry the sheets thereof, by placing between every two of them a sheet or quantity of blotting-paper or other bibulous material, and thus subjecting the sheets of composition and paper to pressure, which causes the moisture in the former to be taken up by the latter, and thus enables the production of a denser and harder article. The composition thus dried is now ready for the dies or molds, which should be hot during the operation of pressing.

Obviously other means of removing the moisture than these above indicated may be resorted to, such as evaporation; but care should be exercised that the composition is not rendered too dry, as that would tend to produce a less desirable result.

The preferred *modus operandi*, however, is to dry the sheet of composition either by atmospheric exposure or otherwise, allowing a slight amount of moisture to remain in the sheet, which is next ground or otherwise reduced to a powder of suitable fineness, which powder is then poured or otherwise introduced into dies or molds that are or may be heated to from 200° to 300° Fahrenheit. The heat of the mold or die causes the powdered material to fuse or weld, and thus, with or without pressure, to assume the contour of the interior of the mold or die. Obviously simultaneous heat and pressure can be used to advantage in this operation.

It is to be here remarked that if the composition is to be molded from the sheet—that is, without having been previously pulverized as aforesaid—preferably, it should not be exposed to atmospheric evaporation, as that has the effect of rendering the composition dried by it very porous and irregular in form.

The product of the die or mold is now immersed in or otherwise treated to an application of a solution of the chloride of calcium of a suitable specific gravity—e. g., 10° to 15° Baumé—wherein it is allowed to remain, or whereby it is treated in such manner as to saturate the composition throughout, or to the depth to which it is desired to have the hardened and insoluble shell or coating extend, since the effect of the chloride of calcium upon the composition is to neutralize the alkali therein, thus rendering the silicate insoluble, while the silicate of lime that remains is closely blended with the bone-dust or other first-named ingredient.

It is believed that the resultant is a material of such nice and intimate relations as to warrant the supposition of its being a perfect union of the substances as they are finally treated. The composition may be colored in any desired manner by the use of suitable coloring matter, which should be added to the said ingredients when first mixed; or the product of the mold or die may be colored by any suitable application of coloring agents.

The proportions of alkaline silicate and pulverized bone, horn, hoof, ivory, or analogues, may be widely varied. All that is required is to employ sufficient silicate to immediately or ultimately soften or agglutinize the other ingredient; hence the proportions and characteristics above stated are convenient and relative, but not absolute. The bone, horn, hoof, ivory, or their analogues, may be comminuted very finely, or otherwise, a pulverized condition being merely to insure the thorough, speedy, and rapid action of the silicate; hence such condition is relative, not absolute. It is also to be remarked that an excellent result can be attained without subjecting the product of the die or mold to the chloride of calcium; and, further, that fragments of the composition, before or after such treatment, may be reduced to a plastic condition by crushing and re-treating with the silicate; also, that the material, when formed by the die or mold, may be bleached to a clear white.

The composition may be formed by any suitable means into bars, or sheets, or other shapes, to facilitate subsequent mechanical manipulation, after which it may be treated with the chloride of calcium, as aforesaid, or used without such treatment, as desired. The material ultimately formed may also be cut and polished, as it has a fine hard surface.

We reserve the right to use this material in the production of any article or all articles of manufacture wherefor its pecularities may render it suitable, and would state that its application in this respect is well known to us, being, at least, co-extensive with that of all of the substances aforesaid. It is specially adapted to the production of buttons, jewelry, billiard-balls, crockery, and can with facility be molded about or upon a metallic or other core.

The chloride of calcium may be powdered and added to the said ingredients, or any thereof, and the mass combined by heat, suitably applied, in which case the entire mass will harden without the treatment with a solution of said chloride.

What we claim as our invention, and desire to secure by Letters Patent, is—

1. An alkaline silicate, as a means of agglutinizing a solid animal tissue, substantially as specified.

2. A composition formed of bone, or horn, or hoof, or ivory, or any two or more, or any equivalent thereof, in combination with an alkaline silicate, substantially as set forth.

3. The new material herein described, which is produced by treating the composition aforesaid with chloride of calcium, substantially as specified.

4. The process above described, which consists, first, in forming the composition of the ingredients specified; and, second, in treating such composition with the chloride of calcium, substantially as set forth.

5. The process above described, which consists, first, in forming the composition as specified; second, shaping such composition by means of dies or molds or other suitable appliances; and, third, treating the product of the step last aforesaid with chloride of calcium, substantially as expressed.

In testimony that we claim the foregoing improvement in silicious material, as above described, we have hereunto set our hands this 7th day of December, 1877.

JOHN W. HYATT.
CHARLES M. HYATT.

Witnesses:
SAML. S. TIFFANY,
ALBERT A. SANBORN.